(12) United States Patent
McCall

(10) Patent No.: US 7,850,115 B2
(45) Date of Patent: Dec. 14, 2010

(54) FISHING LINE DISPENSING ARRANGEMENT AND METHOD

(76) Inventor: Richard E. McCall, 10225 N. 100th Ave., Sun City, AZ (US) 85351

( * ) Notice: Subject to any disclaimer, the term of this patent is extended or adjusted under 35 U.S.C. 154(b) by 0 days.

(21) Appl. No.: 12/390,852

(22) Filed: Feb. 23, 2009

(65) Prior Publication Data

US 2010/0213304 A1    Aug. 26, 2010

(51) Int. Cl.
*B65H 75/14* (2006.01)
(52) U.S. Cl. .................. 242/614; 242/580; 242/588; 242/125.2; 242/911
(58) Field of Classification Search .............. 242/118.4, 242/614, 600, 588, 587.2, 587, 586, 580, 242/579, 172, 911, 125.2, 125.1, 125, 134, 242/129.8, 129.51, 902, 476.6; 43/25, 54.1
See application file for complete search history.

(56) References Cited

U.S. PATENT DOCUMENTS

| 185,864 | A | | 1/1877 | McMillan |
|---|---|---|---|---|
| 376,858 | A | | 1/1888 | Cone |
| 402,498 | A | | 4/1889 | West |
| 643,544 | A | | 2/1900 | Simmons |
| 678,540 | A | | 7/1901 | Chase |
| 2,583,491 | A | | 1/1952 | Orlando ................. 33/216 |
| 2,647,625 | A | | 8/1953 | Mason et al. .............. 206/53 |
| 3,033,487 | A | * | 5/1962 | Walker ................... 242/405.1 |
| 3,133,683 | A | * | 5/1964 | Deacon, Sr. ................ 225/62 |
| 4,056,859 | A | | 11/1977 | Pace .......................... 7/14.1 R |
| 4,387,863 | A | | 6/1983 | Edmonston et al. ...... 242/118.4 |
| 4,583,315 | A | | 4/1986 | Schreck ....................... 43/54.1 |
| 4,696,438 | A | | 9/1987 | Myers ................... 242/118.41 |
| 4,787,168 | A | | 11/1988 | Benit et al. .................. 43/25.2 |
| 5,477,871 | A | | 12/1995 | Sanchez, Jr. ............... 132/323 |
| 6,224,011 | B1 | | 5/2001 | Gavaza, III .............. 242/597.4 |
| 6,398,093 | B1 | | 6/2002 | Dolan .......................... 225/51 |
| 6,425,549 | B1 | * | 7/2002 | Bae et al. .................... 242/580 |
| 6,666,398 | B2 | * | 12/2003 | Allegretto et al. ......... 242/476.6 |
| 7,303,164 | B1 | | 12/2007 | Reno ....................... 242/588.4 |

OTHER PUBLICATIONS

Power Pro EZSpool advertisement from powerpro.com website, Jun. 18, 2008, pp. 1-2.

* cited by examiner

*Primary Examiner*—William E Dondero
(74) *Attorney, Agent, or Firm*—Cahill Glazer PLC

(57) ABSTRACT

A fishing spool dispenser for the easy manipulation and severance of a fishing line. A first flange contains a radially expanding, angled guide slot to secure the free end of the fishing line. A radially inward extending holding clip is disposed along the outer edge of the first flange opposite the supply of fishing line. A cutting slot is formed on the second flange, generally opposite the guide slot, and contains a cutting surface to sever the line. The invention also includes a method of using the dispensing arrangement, running a portion of fishing line from the supply, through the guide slot, under the holding clip and then back to the cutting slot to be cut against a cutting surface within the cutting slot.

5 Claims, 2 Drawing Sheets

FISHING LINE DISPENSING ARRANGEMENT AND METHOD

BACKGROUND OF THE INVENTION

1. Field of the Invention

The present invention is related generally to the field of fishing accessories. More particularly, spools for storing and retrieving fishing line.

2. Description of the Related Art

It is well known in the prior art to transfer fishing line onto fishing reels from supply spools. A problem with dispensing fishing line from spools has been the inherent awkwardness one person has accomplishing this task. In the prior art, simple fishing line dispensers are designed for easy manufacture. The models offer the hobbyist fisherman a low-priced product. Simple fishing line dispensers typically contain a spool, windings of line around a central cylindrical body, and a set of perpendicularly extending flanges enclosing sides of a channel containing the windings supply.

Fishing line is notoriously thin and transparent. This supple nature of the line is necessary to support the stealth fisherman to avoid spooking his/her prey.

When a fisherman attempts to procure a section of fishing line from a simple dispenser, a first hand may be used to hold the dispenser. A second hand is used to draw the free end of the line. Without additional assistance to hold the line or spool, it is difficult to control the dispenser so as to cut the line to a proper length without the risk of losing hold of the dispenser.

Therefore, spools have been invented to secure and sever the fishing line. A basic tab cutter is demonstrated in U.S. Pat. No. 643,544 to Simmons. Simmons teaches a slit to draw the line away from the spool, and an offset tab to both hold and cut the line. Further, U.S. Pat. No. 678,540 to Chase demonstrates a notch on the radial edge of a spool to secure the line and a second cutting notch to sever the line at any length. In an alternative, Chase discloses a cutting projection along the side of the metallic disk, from which a secure portion of the line may be drawn and cut at the cutting projection.

The art lacks a slot-tab-slot dispenser arrangement that is simple to use while being inexpensive to manufacture.

OBJECTS OF THE INVENTION

It is therefore an object of the present invention to provide a fishing line dispenser that is easy to use by one person.

It is another object of the present invention to provide an ergonomic low-cost fishing line dispenser.

It is still another object of the present invention to provide a fishing line dispenser that can be held in one hand, while a second hand is free to take and cut the line.

It is yet another object of the present invention to provide a fishing line dispenser that allows variable length of the line to be drawn.

These and other objects of the present invention will become apparent to those skilled in the art as the description proceeds.

SUMMARY OF THE INVENTION

Accordingly, the present invention improves the standard dispensing spool. A fishing line is wound on a cylindrical drum having opposing radially extending flanges. The flanges may be formed of a solid disk extending from an axis of the cylindrical drum.

In one embodiment, a cylinder is disposed between two substantially parallel disks. The fishing line is wound around the cylinder to store windings on the spool. A guide slot is formed on the edge of the first disk. The slot has width enough to accept and secure the fishing line. A cutting slot is formed in the edge of a second disk. The cutting slot may be directly opposite the guide slot. The cutting slot contains a cutting edge, possibly a metal blade. The guide slot may be angled diagonally-outwards along the winding direction, making it easier to insert the fishing line. The guide slot may also have a wider opening towards the disk edge to accept fishing line, and narrow to a joint, thus forming a rough V-shape so as to pinch the fishing line in place. A holding clip connects to the outer edge of the first disk. The holding clip may extend on the outside surface of the disk, and may point downward to the disk center. The user can pull some fishing line out of the source, place the fishing line into the guide slot, and loop it around the clip. The clip may be displaced on the first disk, apart from the guide slot, at a distance so as to be easily controlled by the fisherman's hands. Ideally, the holding clip is displaced more than five degrees along an arc defined by the disk. Alternatively, the clip may be separated from the guide slot by approximately the length of one to one-and-a-half finger digits.

The guide slot and the cutting slot may both be set at an angle in relation to the winding direction in order to help run the fishing line through the slot-tab-cutter circuit. The angled guide slot and cutter slot may be substantially parallel to one another, where the guide slot is flared away from the windings, and the cutting slot is a flared angle along the winding direction.

The invention also includes a method of drawing and severing a sufficient amount of a fishing line. A user pulls the free end of the line out of the windings supply, places it over and into the guide slot, then around the holding clip, and then back to the cutting slot. Once the line is in the guide slot, the user can press or pull the line into the holding clip, thus pinching by the V-shape corner helping to secure the line. Once around the holding clip, the user can place the line into the cutting slot. With an exertion of pressure on the free end, the user presses the line against a sharp edge in the cutting slot, such as a metal blade edge. This final action cuts the fishing line at the sharp edge, releasing an appropriate amount of fishing line for use.

BRIEF DESCRIPTION OF THE DRAWINGS

The present invention may more readily be understood by reference to the accompanying drawings in which.

DETAILED DESCRIPTION OF THE PREFERRED EMBODIMENTS

Figure 1:
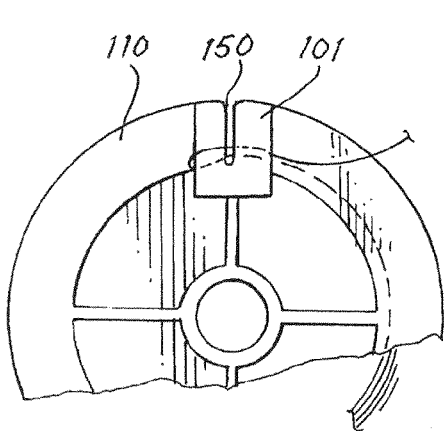
FIG. 1 demonstrates a prior art dispenser containing a slot and tab.
Figure 2:
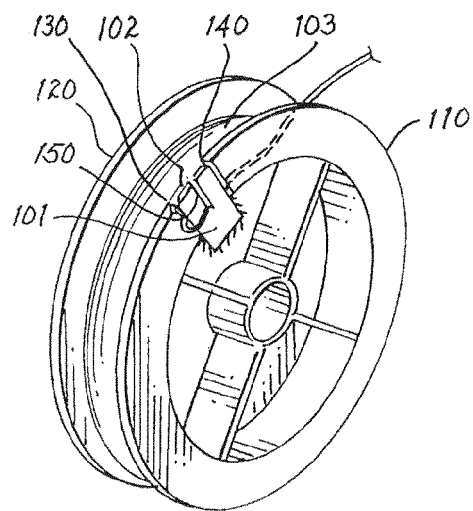
FIG. 2 is a perspective view of the prior art dispenser of FIG. 1.

FIGS. 1-4 is demonstrate prevalent prior art fishing line dispensing systems. FIGS. 1 and 2 demonstrate a slot-tabbing system as known in the art. First flange 110 and second flange 120 hold supply fishing line 103 around a cylinder. Tab 101 is formed to cover an open slot 102 along a radial edge of a first flange 110. Open slot 102 is almost entirely covered by tab 101, yet the slot leaves openings 130 and 140 on either side of the tab. Tab 101 contains a slot 150 on its edge. In order to utilize the tabbing system of the prior art, the fishing line must be maneuvered through opening 130, then slot 150, and finally opening 140 to hold the line secure. This manipulation of the free end of the supply line is rather difficult to perform in a tight spot given the short distances between each of the slots.

Figure 3:
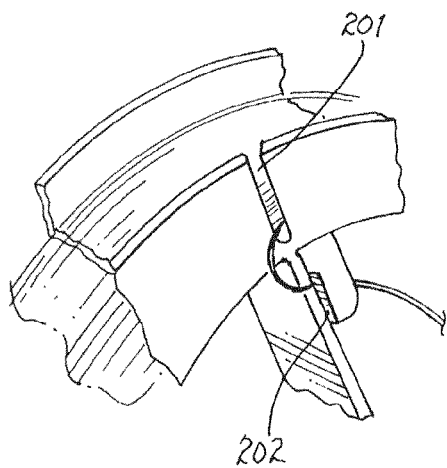
FIG. 3 demonstrates another prior art dispenser containing a slot and cutter.

Referring to FIG. 3 of the prior art, cutting edge 202 is introduced to cut a fishing line secured through slot 201. Once again, this arrangement leaves little room to maneuver the line through the various components of the arrangement.

Figure 4:
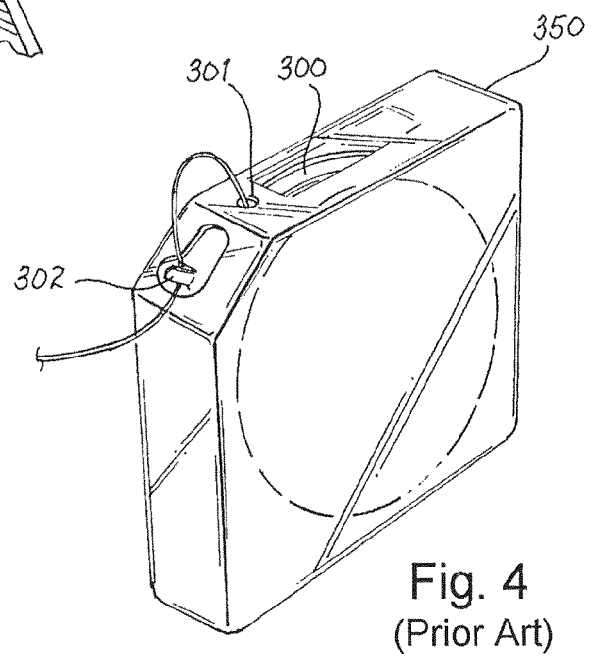
FIG. 4 demonstrates yet another prior art dispenser with cutting tab.

FIG. 4 demonstrates a popular model designed to overcome some of the difficulties of the prior art, this model expands the room to maneuver a fishing line through a slot and tab and cutting surface. Instead of forming a slot on the flange, an exterior casing assembly 350 is placed over the entire spool 300. Slot 301 is a circular cut-out of casing assembly 350 through which the free end of the fishing line must be run. Once through slot 301, the fishing line is then passed over a cutting edge 302, formed on the exterior of the casing. The line may then be severed at the cutting tab. This prior art, arrangement overcomes some of the problems of the prior art, yet remains an inefficient and expensive solution to the problem. The design can be cumbersome for the user to reach the fishing line supply through slot 301 in order to set up this case-spool arrangement. Furthermore, the design is overly complicated to manufacture.

Figure 5:
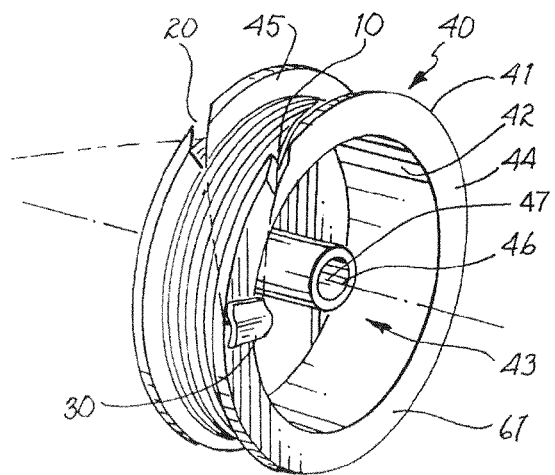
FIG. 5 is a perspective view of a fishing line dispenser constructed in accordance with an embodiment of present invention.

Referring now to the drawings of the preferred embodiment of the present invention, and particularly to FIG. 5, fishing line dispenser 40 has spool 41 of fishing line wrapped around cylinder 42. First and second flanges 44 and 45 mate with cylinder on both ends, the cylinder and flanges form body 43 of the dispenser. Alternatively, first and second flanges 44 and 45 may be formed of solid disks, or flanges. FIG. 5 demonstrates first flange 44 formed as a ring and second flange 45 formed as a solid disk. The flanges may be at ninety-degrees as shown in the drawings, or at another angle thus forming a trapezoidal supply reservoir similar to that shown in U.S. Pat. No. 4,696,438, to Meyers. Fishing line dispenser 40 is disposed around central bore 46 that supports the spool and dispenser, and allows the dispenser 40 to be mounted on an axle (not shown). The central bore allows the dispenser to be rotated about the axle, which can be useful in the initial manufacture and filling of the spool, as well as in drawing off fishing line.

Figure 6:
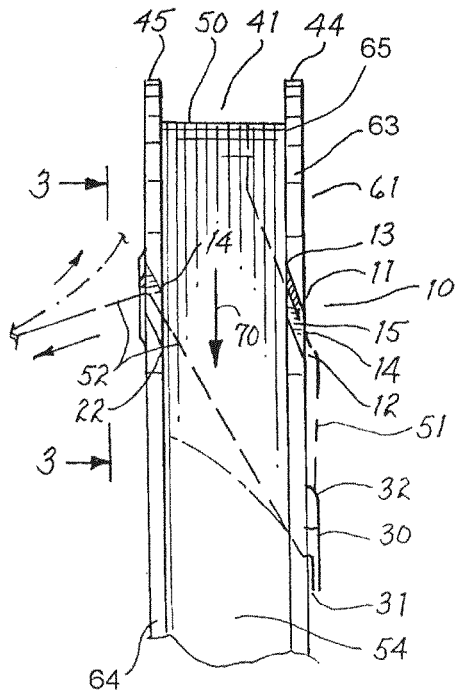
FIG. 6 is a partial side elevational view of the cylinder and two flanges of the fishing line dispenser of FIG. 5.

Referring to FIGS. 5-6, the periphery of each of the two flanges contains a slot. Guide slot 10 is disposed along first flange circumferential edge 63; and cutting slot 20 is disposed along second flange circumferential edge 64. In the preferred embodiment, slots form angled channels that accept a portion of the loose end of a fishing line. The angle of the guide slot directs the fishing line from the source, fishing line supply 54, to the next component in the arrangement, a tab, namely holding clip 30. As fishing line is drawn off the spool in a counter-winding direction, it may be pulled away from the cylinder and returned towards the spool, displaced laterally into guide slot 10. A free portion 51 may then be passed under holding clip 30. In the preferred embodiment, holding clip 30 is disposed along first flange circumferential edge 63 of the first flange and positioned on first flange outer surface 61. Holding clip 30 extends generally toward center 47. Holding clip 30 forms a connection to first flange outer surface 61 at contact point 32 generally towards first flange circumferential edge 63. Holding clip 30 also defines tab opening 31, such that fishing line may be passed under the tab. A portion of the fishing line will be forced against contact point 32 by pulling up on the free end of the fishing line, catching the line within tab opening 31 in a pinching fashion, as it is pinned against the tab and flange near contact point 32.

Fishing line 50 is wrapped around cylinder 42, thus forming a fishing line supply 54. Holding clip 30 is positioned on first flange outer surface 61. Guide slot 10 is formed on first flange circumferential edge 63, while cutting slot 20 is formed on second flange circumferential edge 64. Guide slot 10 is formed of two edges, a first edge 11 that opens to the supply toward the top of the supply, flaring out to first flange outer surface 61. First edge 11 forms an obtuse angle (measured between the first disk and supply) to accept fishing line. Second edge 12 is likewise directed, and positioned opposite first edge 11. Second edge 12 defines an acute angle 14 along first flange circumferential edge 63 of the flange to accept the fishing line (see FIG. 8). Together, both edges are parallel in a plane with respect to an edge-on view. However, in a third-dimension, the guide slot forms a V-shape, expanding apart radially from center 47, and converging at joint 13, thus defining a V-shape channel, channel 15, to hold and secure a section of fishing line.

In order to operate the dispensing spool, free portion 51 of fishing line 50 is drawn from supply 54 and placed into channel 15. The free portion is placed into tab opening 31 of holding clip 30 and pinned near contact point 32. The free portion is thus divided at the contact point, leaving remainder 52 as the free end of the fishing line. Remainder 52 is then returned opposite winding direction 70, over the supply and toward cutting slot 20. In the preferred embodiment, cutting slot 20 contains edges that are aligned with similar obtuse and acute angles as in guide slot 10, however, they do not form a V-shaped channel. Instead, cutting slot 20 contains a third edge, cutting surface 22, such that when remainder 52 is set into channel 26, and a force is applied, the remainder is severed at cutting surface 22 (see FIG. 7).

Figure 7:
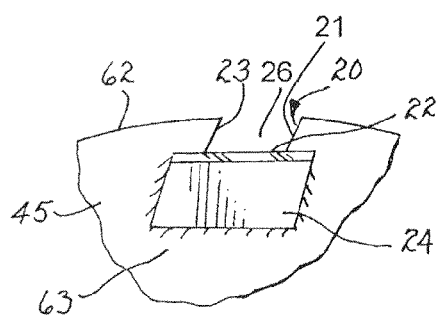
FIG. 7 is a enlarged view along Line 7-7 of FIG. 6 showing the second channel.

FIG. 7 illustrates cutting slot 20 of the preferred embodiment. Channel 26 is positioned on second flange circumferential edge 64. Channel 26 is defined on two sides, by third edge 21 and fourth edge 23, and on the bottom by cutting surface 22. Cutting surface 22 is created by an embedded blade 24. Blade 24 is embedded into the second flange outer surface 62 and formed partially within second flange 45. The user may place a fishing line portion within channel 26 and force the line against cutting surface 22, in order to sever the line.

Figure 8:
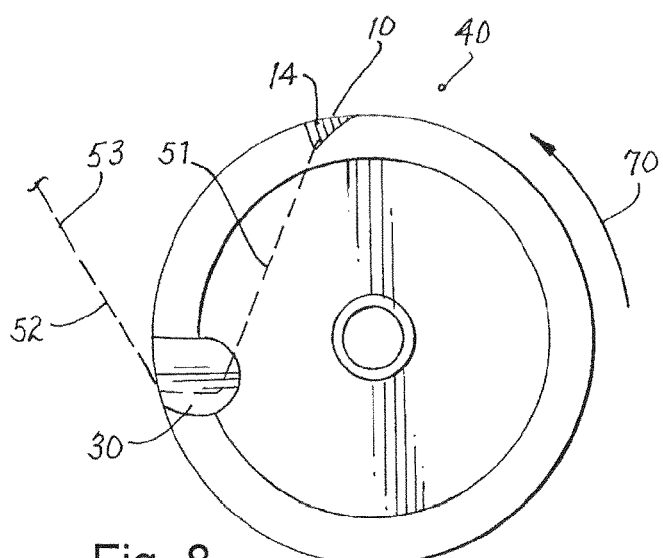
FIG. 8 is a schematic view of the fishing line as being drawn out in an embodiment of the present invention.

Referring to FIG. 8, a profile view of the first flange of the dispenser is shown. Winding direction 70 is indicated by an arrow. The fishing line is pulled from the supply and placed through guide slot 10, leaving free portion 51. Guide slot 10 is configured as in the preferred embodiment such that only an edge of acute angle 14 is visible. Free portion 51 of fishing line emerges from guide slot 10. Free portion 51 is then wound around holding clip 30, thus defining remainder 52. The length of the remainder from the cutting slot to the termination 53 of the fishing line is of sufficient length to be gripped by a human hand or finger. In the preferred embodiment, remainder 52 is at least one inch, preferably at least one and a quarter inches in length to three inches, and at least long enough for suitable manipulation by a finger. The last digit of a human finger approximates the necessary minimum length of the remainder and is used to establish the distance between the second slot and the tab.

Referring now to the orientation, position and shape of the slots as seen in FIG. 6, guide slot 10 has an axis angled with respect to a plane passing perpendicular to a spool. When viewed from above, in two-dimensions, the slots appear as two pairs of parallel line segments. For example, guide slot first and second edges 11 and 12 are seen as parallel lines, corresponding to the edges formed within the walls of the disks. The disks appear as vertically-parallel rectangular segments of first flange circumferential edge 63 with first flange interior surface 65 and first flange outer surface 61, each interrupted by a removed section. The removed section is the opening to channel 15 wherein fishing line segment may be placed. On first flange interior surface 65, channel 15 crosses the vertically-oriented first flange circumferential edge 63, seen as a rectangle in two-dimensions, at an angle roughly corresponding to forty-five degrees. The line segment follows this angle straight to the other vertically-oriented, first flange outer surface 61. Thus channel 15 is formed at an angle from the interior surface 65 to the first flange outer surface 61 along first flange circumferential edge 63. From above, channel 15, may be viewed as a pair of intersecting parallel lines interrupting two parallel vertical lines, at about forty-five degrees.

Second flange circumferential edge 64 contains similar structure and angled slot formation. In the preferred embodiment, the guide and cutting slots will be formed nearly directly across from each other on opposite flanges, however, the slots are formed in a manner providing the best ergonomic use of the slots and tab given the various dimensions of the spool.

In a preferred embodiment, when viewed from the side, the slots visually disappear, given the width of the slot in relation to the width of the flange.

The present invention has been described in terms of selected specific embodiments of the invention incorporating details to facilitate the understanding of the principles of construction and operation of the invention. Such reference herein to a specific embodiment and details thereof is not intended to limit the scope of the claims appended hereto. It will be apparent to those skilled in the art that modifications may be made in the embodiments chosen for illustration without departing from the spirit and scope of the invention.

What is claimed is:

1. A method of drawing a segment of fishing line from a flanged spool, where the fishing line is wound in a first direction around a spool, comprising the steps of:
    a) drawing a first end of the fishing line off the spool;
    b) placing a portion of the fishing line into a first channel formed in an indentation across a first flange, isolating a free portion of the fishing line;
    c) drawing the free portion around a tab disposed along the first flange, whereby a remainder is isolated;
    d) drawing the remainder towards a second direction into a second channel on a second flange, the second channel including a cutting edge; and
    e) severing the remainder at the second channel.

2. The method as recited by claim 1 wherein the step of placing includes ensuring the fishing line portion is secure in first channel by forcing contact of the portion with an edge in the channel.

3. The method as recited by claim 1 wherein the first flange has a radial edge, and the tab is disposed along the first flange radial edge and wherein the tab is removed from the first channel by an arc length of greater than five degrees.

4. The method as recited by claim 1 wherein the second channel cutting edge is a metal surface.

5. The method as in claim 1 wherein the first flange comprises an inner edge and an outer edge and a radial edge, wherein the inner edge is proximal to the spool, the outer edge is distal the spool, wherein the radial edge is along the circumference of the flange, and wherein the tab is disposed on the outer edge of the first flange proximate the radial edge.

* * * * *